United States Patent
Rasanen (10) Patent No.: US 10,230,573 B2
(45) Date of Patent: Mar. 12, 2019

(54) MANAGEMENT OF NETWORK ENTITY SELECTION

(71) Applicant: NOKIA SOLUTIONS AND NETWORKS OY, Espoo (FI)

(72) Inventor: Juha Antero Rasanen, Espoo (FI)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 152 days.

(21) Appl. No.: 15/101,992

(22) PCT Filed: Dec. 6, 2013

(86) PCT No.: PCT/EP2013/075756
§ 371 (c)(1),
(2) Date: Jun. 6, 2016

(87) PCT Pub. No.: WO2015/082013
PCT Pub. Date: Jun. 11, 2015

(65) Prior Publication Data
US 2016/0308715 A1    Oct. 20, 2016

(51) Int. Cl.
*G06F 15/177* (2006.01)
*H04L 12/24* (2006.01)
(Continued)

(52) U.S. Cl.
CPC ...... *H04L 41/0806* (2013.01); *H04L 41/0803* (2013.01); *H04L 67/10* (2013.01);
(Continued)

(58) Field of Classification Search
CPC ......... H04L 12/24; H04L 41/12; H04L 67/10; H04L 41/0806; H04L 41/0803; H04W 4/02; H04W 28/16; H04W 4/25; H04W 64/00
See application file for complete search history.

(56) References Cited

U.S. PATENT DOCUMENTS 6,954,429 B2 * 10/2005 Horton .................. H04J 3/1682
                                                      370/230.1
8,639,214 B1 *  1/2014 Fujisaki ................. G06Q 20/32
                                                      379/88.03
(Continued)

OTHER PUBLICATIONS

International Search Report & Written Opinion dated Aug. 7, 2014 corresponding to International Patent Application No. PCT/EP2013/075756.
(Continued)

*Primary Examiner* — Benjamin M Thieu
(74) *Attorney, Agent, or Firm* — Squire Patton Boggs (US) LLP (57) ABSTRACT

An apparatus and a method are provided by which, in an apparatus for setting up and maintaining network functions, identities of first type network functions and second type network functions are stored, wherein the first type of virtual network functions are configured to select one or more of the second type network functions, and, for each first type network function, information regarding second type network functions which are selectable by the corresponding first type network function based on information regarding physical conditions of the first type network functions and the second type of virtual network functions are maintained.

19 Claims, 3 Drawing Sheets

(51) Int. Cl.
*H04L 29/08* (2006.01)
*H04W 4/02* (2018.01)
*H04W 28/16* (2009.01)
*H04W 64/00* (2009.01)

(52) U.S. Cl.
CPC .......... *H04W 4/025* (2013.01); *H04W 28/16* (2013.01); *H04L 41/12* (2013.01); *H04W 4/02* (2013.01); *H04W 64/00* (2013.01)

(56) References Cited

U.S. PATENT DOCUMENTS

| | | | |
|---|---|---|---|
| 2005/0198248 A1* | 9/2005 | Morimoto | G06F 17/5068 709/223 |
| 2006/0183421 A1* | 8/2006 | Proctor, Jr. | H04B 7/15521 455/11.1 |
| 2012/0323343 A1* | 12/2012 | Grichnik | G05B 23/0235 700/30 |
| 2015/0036541 A1* | 2/2015 | Xu | H04L 41/0226 370/254 |

OTHER PUBLICATIONS

Intel Corporation et al., "Data-modelling and Service Chains alignment; NFVMAN (13)31_007rl_Data-modelling_and_Service_Chains_alignment," ETSI Draft; NFVMAN (13)31_007rl_Data-modelling_and_Service_Chains_alignment, vol. ISG, Nov. 1, 2013, pp. 1-16, XP014159910.

ETSI GS NFV-INF 001 V1.1.1 (Jan. 2015), Group Specification, "Network Functions Virtualisation (NFV); Infrastructure Overview," ETSI, Jan. 2015, 59 pages.

Kostas Pentikousis et al., "MobileFlow: Toward Software-Defined Mobile Networks," IEEE Communications Magazine, vol. 51, No. 7, Jul. 1, 2013, pp. 44-53, XP011519224.

ETSI; White Paper; "Network Functions Virtualisation;" Introductory White Paper; Issue 1; Oct. 22-24, 2012 at the SDN and OpenFlow World Congress; Darmstadt, Germany, pp. 1-16.

Marcus Scholler et al., "Resilient deployment of virtual network functions," 2013 5th International Congress on Ultra Modern Telecommunications and Control Systems and Workshops (ICUMT), IEEE, Sep. 10, 2013, pp. 208-214, XP032587119.

Aaron Gember et al., "Stratus: A Network-Aware Orchestration Layer for Virtual Middleboxes in Clouds," May 1, 2013, XP055131819, pp. 1-14, retrieved from Internet: http://arxiv.org/abs/1305.0209.

3GPP TS 23.228 V12.2.0 (Sep. 2013), Technical Specification, 3rd Generation Partnership Project; Technical Specification Group Services and System Aspects; IP Multimedia Subsystem (IMS); Stage 2 (Release 12), Sep. 2013, 296 pages.

3GPP TS 23.401 V12.2.0 (Sep. 2013), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 12), Sep. 2013, 293 pages.

3GPP TS 29.061 V123.0 (Sep. 2013), Technical Specification, 3rd Generation Partnership Project; Technical Specification Group Core Network and Terminals; Interworking between the Public Land Mobile Network (PLMN) supporting packet based services and Packet Data Networks (PDN) (Release 12), Sep. 2013, 164 pages.

* cited by examiner

MANAGEMENT OF NETWORK ENTITY SELECTION

FIELD OF THE INVENTION

The present invention relates to apparatuses, methods and computer programs for managing network entity selection.

RELATED BACKGROUND ART

The following meanings for the abbreviations used in this specification apply:
3GPP 3rd generation partnership project
ETSI European Telecommunications Standards Institute
GW Gateway
I-CSCF Interrogating call server control function
ID Identity, Identifier
IMS IP multimedia subsystem
I/O Input/output
IP Internet protocol
ISG Industry specification group
LTE Long term evolution
MME Mobile management entity
NFVO Network functions virtualization orchestrator
O&M Operation & Maintenance
OS Operating system
PCRF Policy and charging rules function
P-CSCF Proxy call server control function
PE Physical environment
P-GW Packet data network gateway
PM Physical machine
S-CSCF Serving call server control function
SGSN Serving general packet radio service support node
S-GW Serving gateway
UE User equipment
VM Virtual machine
VNF Virtualized network function Embodiments of the present invention relate to management for network entity selection. In particular, 3GPP mobile network contains a number of network entities that are selected from a number of similar entities by other kinds of entities that need to establish communication with the first kind of entities to enable user sessions. In many cases at least one of the selection criteria is network topology. The addresses or identities of the candidate entities are typically configured in the entity that shall select one entity from the candidate entities.

Figure 3:
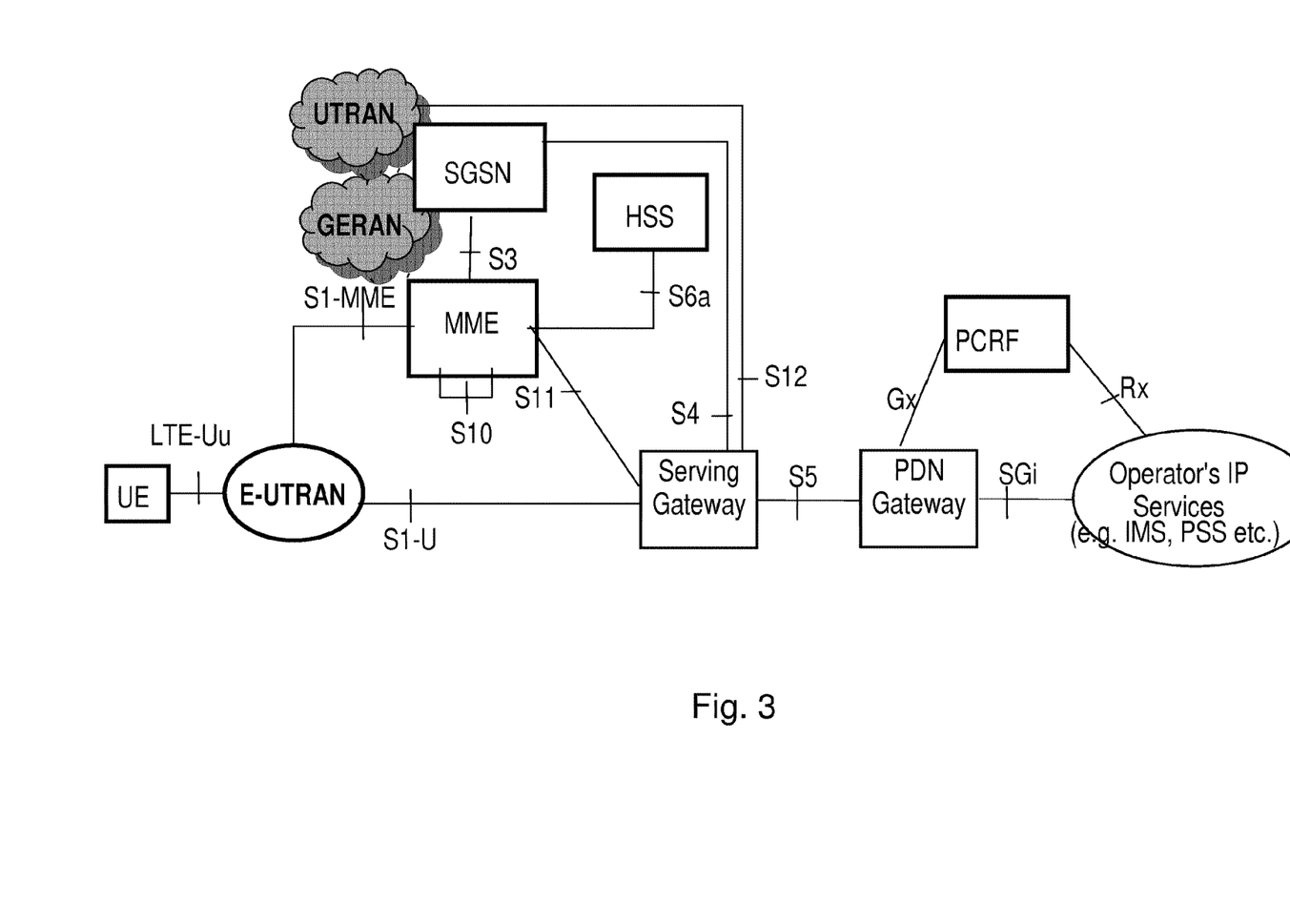
FIG. 3 shows a non-roaming architecture for 3GPP accesses.

An example is MME which is selected by a radio network entity, e.g. eNodeB. Further packet core network examples of entities selected by another entity are S-GW and SGSN. (Refer to 3GPP TS 23.401 V12.2.0 (2013-09)/subclause 4.3.8). FIG. 3 reproduces FIG. 4.2.1-1 of 3GPP TS 23.401 V12.2.0 (2013-09) and shows a non-roaming architecture for 3GPP accesses. Examples of 3GPP network entities selected in such a way in IMS environment are P-CSCF which is selected by P-GW based on preconfigured P-CSCF addresses (refer to 3GPP TS 29.061 V12.3.0 (2013-09)/subclause 13a.2.1), S-CSCF which is selected by I-CSCF (refer to 3GPP TS 23.228 V12.2.0 (2013-09)/subclause 5.1.2.1). Further examples of entities selected from amongst a number of similar entities are PCRF and I-CSCF.

ETSI ISG NFV is studying network function virtualization concerning mobile network environment. In this environment the virtualized network entities are managed by the network function virtualization orchestrator (NFVO). The NFVO dynamically and automatically distributes and maintains virtualized network functions in the infrastructure, i.e. sets up virtual machines (VMs) to run on given physical machines (PMs) and sets up virtual network functions/entities to run on the VMs, defines and allocates and scales resources to the virtual entities and machines. The NVFO may also have an interface to legacy O&M functions to utilize existing O&M functionalities.

Concerning some network entities in 3GPP environment, a given/certain entity amongst a number of similar entities is selected by another entity for a user/UE, when the UE attaches the network or sets up a session (like e.g. an IMS session). Examples of such selectable entities are MME, S-GW, SGSN, PCRF, P-CSCF.

This kind of selection of network entities is to be supported also in virtualized environments.

SUMMARY OF THE INVENTION

Embodiments of the present invention address this situation and aim to provide an improved management of network entity selection in particular, but not exclusively, in a virtualized network environment.

According to a first aspect of the present invention an apparatus is provided which comprises a memory and a processor, wherein the processor is configured to set up and maintain network functions, and the memory is configured to store identities of first type network functions and second type network functions, wherein the first type of virtual network functions are configured to select one or more of the second type network functions, and the processor is further configured to maintain, in the memory, for each first type network function, information regarding second type network functions, which are selectable by the corresponding first type network function, based on information regarding physical conditions of the first type network functions and the second type of virtual network functions.

According to a second aspect of the present invention, an apparatus is provided which comprises a memory and a processor, wherein the processor is configured to operate a first type network function, to receive information regarding second type network functions which are selectable based on information regarding physical conditions of the apparatus and the second type of virtual network functions, and to select a second type network function based on the received information.

According to a third aspect of the present invention, a method is provided which comprises
    setting up and maintaining network functions,
    storing identities of first type network functions and second type network functions, wherein the first type of virtual network functions are configured to select one or more of the second type network functions, and
    maintaining, for each first type network function, information regarding second type network functions which are selectable by the corresponding first type network function based on information regarding physical conditions of the first type network functions and the second type of virtual network functions.

According to a fourth aspect of the present invention, a method is provided which comprises
    receiving information regarding second type network functions which are selectable based on information regarding physical conditions of the first network type function and the second type of virtual network functions, and
    selecting a second type network function based on the received information.

Modifications of the above aspects are defined in the dependent claims.

According to a fifth aspect, there is provided a computer program product, comprising software code means for performing the above defined methods and/or their modifications, when said product is run on a computer such as a processing means or module. The computer program product may be embodied on a computer-readable medium.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

Before describing embodiments of the present invention, however, the problem underlying the present application is summarized again.

As mentioned above, it is the aim of embodiments of the present invention to improve the selection of network entities in particular (but not exclusively) for a case in which network entities are realized as virtualized network functions.

Several vendors offer hardware platforms/physical machines (PM) and software environments with virtual machines (VM) to be used for network functions virtualization. Some environments support optimized communication between VMs residing on the same physical environment (PE)/physical machine PM by way of supporting inter VM communication through common memory within the PM, i.e. avoiding looping input/output facilities and possible PM external transmission paths and entities/routers. In other words, VMs residing on the same PM can communicate with each other on the hypervisor/OS level, thus speeding up operations and consuming less (input/output (I/O) and PM external) resources.

In a fully fledged, virtualized telecommunication environment, like e.g. 3GPP mobile network, there will be a number of physical machines (PMs), or servers or server farms, at least in big networks. And each PM may support different kinds of VMs, i.e. the same kinds of VMs reside in more than one PM (for security reasons etc.). Inter VM communication on the hypervisor/OS level can take place within a PM, or (perhaps even) within a server farm, but not between such physical environments (PE).

It would be beneficial, if relevant virtual network entities (VMs) used by a given UE reside in the same physical environment (PE). Then, the communication between the entities/VMs would be PM/PE internal, intra VM communication on the hypervisor/OS level, instead of transporting the messages via I/O and external routers.

It would also be beneficial in a dynamically adjustable virtualized environment, if adding and removing of VMs to/from the system or moving VMs from one PE/PM to another PE/PM, i.e. the orchestration of resources, could work flexibly in an automated way without requiring new functionalities or mechanisms and without affecting the operation of the virtualized software entities, e.g. their network entity selection mechanisms. Otherwise a lot of the benefits of network functions virtualization are lost.

This is achieved by embodiments of the present invention, as will be described in the following in detail.

Some embodiments are described in the following by referring to a virtual network in which a network function virtualization orchestrator (NFVO) is responsible for managing virtual network functions (VNFs).

The network management/network function virtualization orchestrator (NFVO) is made aware of virtual network functions (VNFs) that select a counterpart entity as per preconfigured address and/or identity information, and of virtual network functions (VNFs) that are to be selected. For example, the NFVO shall know that a virtualized radio network control entity selects one of many available MMEs or SGSNs. As another example, the NFVO shall know that a virtualized P-GW (control part) selects one of many available P-CSCFs.

Per each selecting entity, the NFVO keeps abreast of the addresses and/or identities of the selectable entities which the NFVO establishes or has established in the same physical entity/physical environment (PE)/physical machine (PM).

Figure 1:
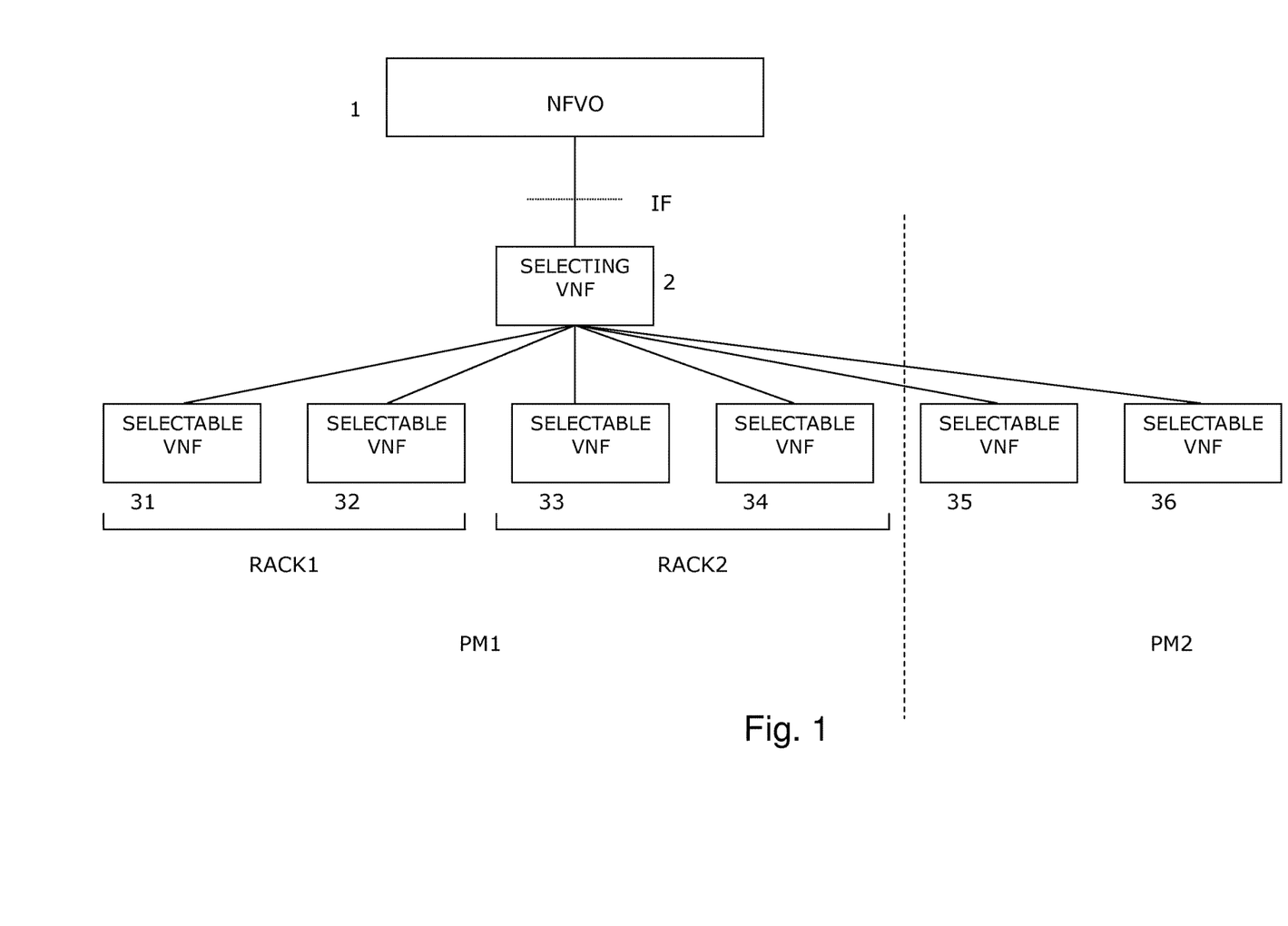
FIG. 1 shows a simplified network architecture according to an embodiment of the present invention.

An example for a simplified network structure is shown in FIG. 1. Reference numeral 1 denotes an NFVO as described above, and reference numeral 2 describes a selecting VNF, i.e., a selecting network entity. As mentioned above, an example may be a P-GW. In FIG. 1, only one selecting VNF is shown. Reference numerals 31 to 36 denote several selectable VNFs, which may be selected by the selecting VNF 2. For example, the selectable VNFs may all carry out the function of a P-CSCF.

The selectable VNFs 31 to 34 are located in a first physical machine PM1, whereas the selectable VNFs 35 and 36 are located in a second physical machine PM2. In this example, it is assumed that also the selecting VNF is located in the first physical machine PM1.

Hence, according to the embodiment described above, the NFVO will maintain a list for candidate selectable VNFs for the selecting VNF 2, which contains only the selectable VNFs 31 to 34. The selectable VNFs 35 and 36 are not included since these are located in PM2.

According to a modification of this embodiment, the selection can be further enhanced, namely by improving the granularity.

That is, in order to increase granularity of the selection process and/or to enable the selection of an entity that is the closest or the most optimal to support communication between the selecting and selectable entity, the NVFO may classify or define the proximity of the selecting entity and the candidate selectable entities. The definition of the proximity may be based on issues like (1) the entities reside on the same hardware blade, (2) the entities reside on the same rack, (3) the entities reside on the same server, (4) there is an optimized I/O circuitry between the entities, (5) there is an optimized routing or networking between the entities, (6) delay or type of the I/O circuitry, etc. The classification or proximity may also be indicated by a priority value.

It is to be noted that in cases (4) to (6) above the entities may also reside on different physical entities/physical machines (PM)/physical environments (PE) and may consequently use relevant I/O circuitry of the PMs/PEs and/or routing between the PMs/PEs.

In the example shown in FIG. 1 it is indicated that selectable VNFs 31 and 32 are located in a first rack (Rack1), whereas the selectable VNFs 33 and 34 are located in a second rack (Rack2), where also the selecting VNF 2 is located. Thus, classification or proximity information (or parameter) will be set for the VNFs 33 and 34 such that they are higher than that of the VNFs 31 and 32. Higher means that the selecting VNF 2 is aware from this classification or proximity information that a selection of the VNFs 33 and 34 is to be preferred, since they provide an optimum location.

The classification or proximity information is an example for a physical connection related parameter, which indicates condition and/or quality of a physical connection between the physical location of the selecting VNF 2 (as an example for a first type network function) and the physical location of one of the selectable VNFs 31 to 34 (as an example for a corresponding second type network function). That is, the above example for the classification or proximity information for the physical connection related parameter is a parameter which indicates a classification of the physical connection or proximity between the physical location of the selecting VNF 2 and the physical location of the corresponding selectable VNF. According to a more general example, the physical connection related parameter depends on the physical location where the corresponding virtual network function is established.

The NFVO configures the addresses and/or identities of the selectable entities, either with the classification/proximity information described above or just with a higher priority than possible other entities or as the only available entities, to the selecting entity and dynamically keeps the configuration up-to-date, if/when for any reason existing VNFs/VMs are removed or moved to another PE/PM, or new VNFs/VMs are established. The configuration may take place via existing O&M links/facilities to avoid defining/establishing new interfaces.

The selecting (virtualized or non-virtualized) network functions may use the increased granularity to select the best available entity using various criteria like minimizing delay, maximising attainable bandwidth, optimizing the use of resources, etc.

Alternatively, it is possible that the selecting network functions just uses the dynamically configured selection information as per current specifications. In this way, the selecting function does not have to be aware of the amended features, so that backwards compatibility by ignoring the new parameters can easily be achieved.

The result is that adjacent entities (signalling/communication with each other) optimally reside in the same PM/PE and can benefit from optimized intra-PM/PE communication.

Thus, according to embodiments of the present invention, actions (such as storing entity related address/identity information, updating pre-configured information in related VNFs/VMs) by/at NFVO and updating a network management interface between NFVO and VNFs/VMs are defined. This network management interface is indicated by IF in FIG. 1.

There are several ways to standardize and/or implement the required management interface between NFVO and VNFs/VMs in practice. One way could be to use network management interfaces directly between NFVO and VNFs/VMs, as indicated in FIG. 1, if such interfaces are anyway defined for the virtualized network. Another way could be, supposing that existing network management systems take care of the basic management and configuration issues of the virtualized entities too, to use current network management systems complemented with proper information/parameter exchange.

It is to be noted that the embodiments and the present invention in general are not limited to the specific examples given above.

For example, in the embodiments described above mainly virtualized network functions (VNFs) were shown. However, the present invention is not limited to this. For example, the network functions do not have to be all virtualized. For example, the P-GW may be non-virtualized network function and only the selectable P-CSCFs may be virtualized network functions, or only a part of the selectable P-CSCFs may be virtualized, whereas some (or even all) selectable P-CSCFs are non-virtualized.

Furthermore, in some embodiments, P-GW was described as an example for a selecting VNF or selecting network function, and P-CSCF was described as an example for a selectable VNF or selectable network function. However, the present invention is not limited to this. Any kind of network function, network element or the like which has to select another network function, network element or the like can be applied as the selecting VNF or selecting network function, and any kind of network function, network element which can be selected by another element can be applied as the selectable VNF or selectable network function.

Moreover, it is to be noted to be that a selectable VNF or network function may be a selecting VNF or network function for another VNF or network function. For example, a selected S-GW may itself select a P-GW or the like.

Figure 2:
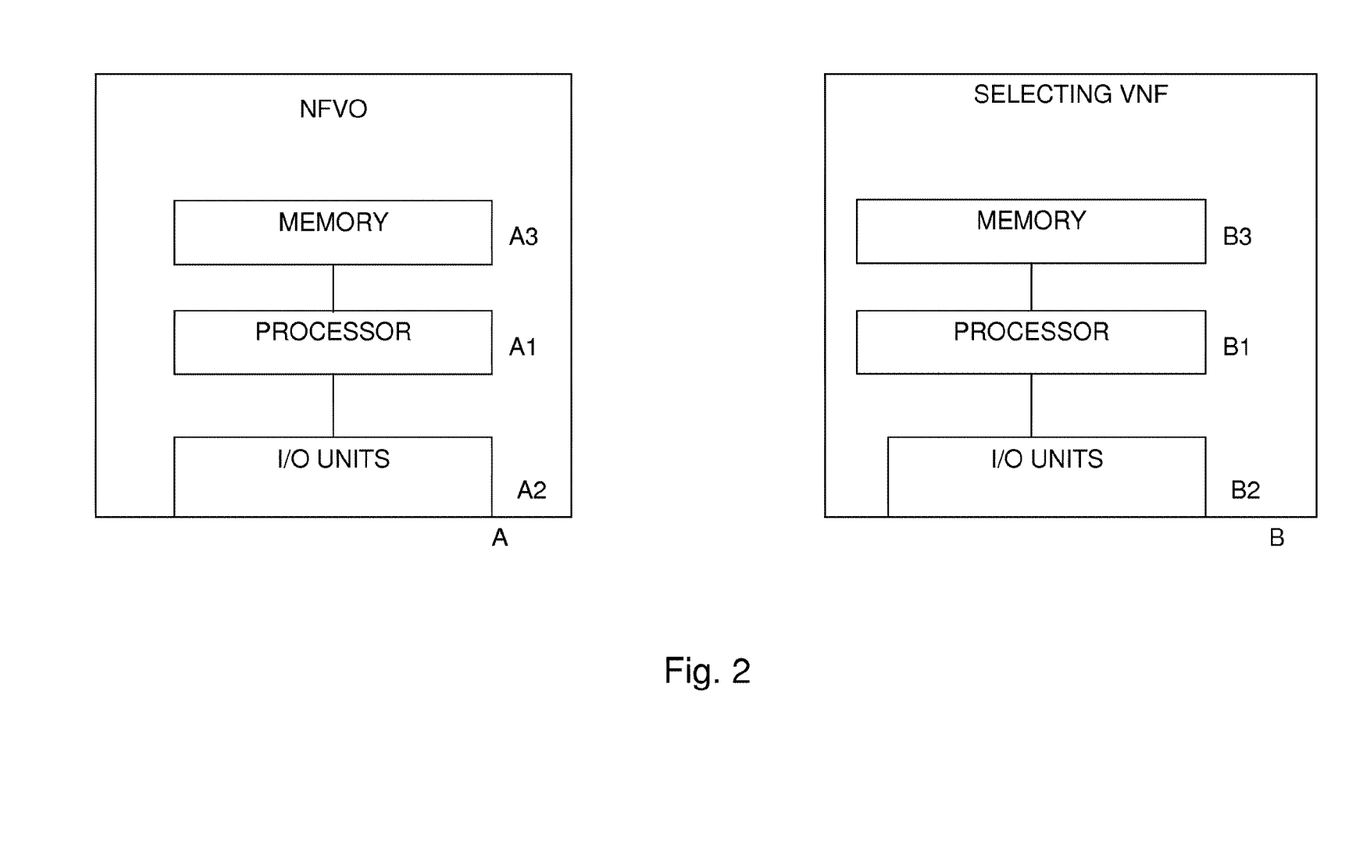
FIG. 2 shows a network functions virtualization orchestrator (NFVO) and a virtualized network function (VNF) according to an embodiment of the present invention.

In the following, a general embodiment of the present invention is described by referring to FIG. 2. In particular, FIG. 2 shows two examples for network elements involved in procedures according to embodiments of the present invention. In more detail, FIG. 2 shows a NFVO A (e.g., the NFVO shown in FIG. 1), and a selecting network function B (e.g., the selecting VNF 2 shown in FIG. 1).

It is to be noted that the network elements A and B shown in FIG. 2 may comprise several further elements or functions besides those described in connection therewith but which are omitted herein for the sake of simplicity as they are not essential for understanding the invention. Moreover, both network elements may be realized by dedicated hardware or may be virtualized.

As shown in FIG. 2, the NFVO A comprises a processing function or processor A1, such as a CPU or the like, which executes instructions given by programs or the like. The processor A1 may comprise further portions dedicated to specific processings as described below. Portions for executing such specific processings may be also provided as discrete elements or within one or more further processors, for example. Reference sign A2 denotes transceivers or input/output (I/O) units connected to the processor A1. Reference sign A3 denotes a memory usable, for example, for storing data and programs to be executed by the processor A1 and/or as a working storage of the processor A1.

The memory A3 is configured to store identities of first type network functions (e.g., of the VNF 2) and second type network functions (e.g., the VNFs 31 to 36), wherein the first type of virtual network functions are configured to select one or more of the second type network functions. The processor A1 is configured to maintain, in the memory, for each first type network function, information regarding second type network functions which are selectable by the corresponding first type network function based on information regarding physical conditions of the first type network functions and the second type of virtual network functions.

Similar as the NFVO A, the selecting VNF B comprises a processing function or processor B1, such as a CPU or the like, which executes instructions given by programs or the like. The processor A1 may comprise further portions dedicated to specific processings as described below. Portions for executing such specific processings may be also provided as discrete elements or within one or more further processors, for example. Reference sign B2 denotes transceivers or input/output (I/O) units connected to the processor B1. Reference sign B3 denotes a memory usable, for example, for storing data and programs to be executed by the processor B1 and/or as a working storage of the processor B1.

The processor B1 is configured to operate a first type network function, to receive information regarding second type network functions which are selectable based on information regarding physical conditions of the apparatus and the second type of virtual network functions, and to select a second type network function based on the received information.

The physical condition of the first or second type network function includes a physical location where the first or second type network function is established (e.g., the position in a rack or the like), and/or a hardware connection condition at the physical location (e.g., data rate at this position in a rack, connection circuitry or the like). The physical location as described above may include a physical entity, a physical environment (PE) and/or a physical machine (PM).

According to some embodiments, the information regarding second type network functions which are selectable by the corresponding first type network function based on information regarding physical conditions of the first type network functions and the second type of virtual network functions, are implemented such that only those identities and/or addresses of second type network functions are configured to the first network functions, which are in same physical condition as the first network functions (e.g., are in the same physical location).

According to some other embodiments, the information regarding the second type network functions which are selectable by the corresponding first type network function based on information regarding physical conditions of the first type network functions and the second type of virtual network functions, are implemented such that this information contains a physical connection related parameter, which indicates condition and/or quality of a physical connection between the physical location of the first type network function and the physical location of a corresponding second type network function. This parameter may indicate a classification of the physical connection or proximity between the physical location of the first type network function and the physical location of the corresponding second type network function, and/or may indicate different priorities of the second type network functions for the first type network function.

In this way, it is possible to configure the first type network functions with all second type network functions including this parameter, which indicates the suitability of the second type network function for the particular first type network function.

It is also possible to combine the two approaches described above, namely that only some of the second type network functions (chosen based on the physical condition, e.g., the physical location) are configured to the first type network function, and wherein the information regarding these second type network functions, which are configured to the first type network function, additionally contain the physical connection related parameter.

Thus, according to certain embodiments, an apparatus and a method are provided by which, in an apparatus for setting up and maintaining network functions, identities of first type network functions and second type network functions are stored, wherein the first type of virtual network functions are configured to select one or more of the second type network functions, and, for each first type network function, information regarding second type network functions which are selectable by the corresponding first type network function based on information regarding physical conditions of the first type network functions and the second type of virtual network functions are maintained.

According to a further aspect of embodiments of the present invention, an apparatus is provided which comprises
  means for setting up and maintaining network functions,
  means for storing identities of first type network functions and second type network functions, wherein the first type of virtual network functions are configured to select one or more of the second type network functions, and
  means for maintaining, for each first type network function, information regarding second type network functions which are selectable by the corresponding first type network function based on information regarding physical conditions of the first type network functions and the second type of virtual network functions.

According to another aspect of embodiments of the present invention, an apparatus is provided which comprises
  means for receiving information regarding second type network functions which are selectable based on information regarding physical conditions of the first network type function and the second type of virtual network functions, and
  means for selecting a second type network function based on the received information.

It is to be understood that any of the above modifications can be applied singly or in combination to the respective aspects and/or embodiments to which they refer, unless they are explicitly stated as excluding alternatives.

For the purpose of the present invention as described herein above, it should be noted that
  method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;
  generally, any method step is suitable to be implemented as software or by hardware without changing the idea of the invention in terms of the functionality implemented;
  method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means or units) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. An apparatus comprising:
a memory; and
a processor, wherein
the processor is configured to set up and maintain virtual network functions, and
the memory is configured to store
identities of a first type of the virtual network functions and of a second type of the virtual network functions, wherein the first type of the virtual network functions is configured to select one or more of the second type of the virtual network functions, and
the processor is configured to maintain, in the memory, for each identity of the first type of the virtual network functions, information regarding identities of the second type of the virtual network functions, which are selectable by the corresponding identity of the first type of the virtual network functions, based on information regarding physical conditions of the identity of the first type of the virtual network functions and the identities of the second type of the virtual network functions, and
the processor is further configured to perform configuration of the information regarding the identities of the second type of the virtual network functions with different priorities for different physical conditions, and
to provide the information regarding the identities of the second type of the virtual network functions configured with the different priorities for the different physical conditions to each identity of the first type of the virtual network functions via a network management interface defined between the apparatus and the first type of the virtualized network functions.

2. The apparatus according to claim 1, wherein a physical condition of the first or the second type of the virtual network functions include
a physical location where the identities of the first or the second type of the network functions are established, or
a hardware connection condition at the physical location.

3. The apparatus according to claim 1, wherein the physical condition of the first or the second type of the virtual network functions includes a physical location where the identities of the first or the second type of the virtual network functions are established, and
the processor is configured to maintain the information regarding the identities of the second type of the virtual network functions by maintaining only those identities of the second type of the virtual network functions which are established on the same physical location.

4. The apparatus according to claim 1, wherein
the information regarding the identities of the second type of the virtual network functions provided for each identity of the first type of the virtual network functions comprises a physical connection related parameter, which indicates condition or quality of a physical connection between the physical location of each identity of the first type of the virtual network functions and the physical location of the corresponding identities of the second type of the virtual network functions.

5. The apparatus according to claim 4, wherein the physical connection related parameter indicates a classification of the physical connection or proximity between the physical location of each identity of the first type of the virtual network functions and the physical location of the corresponding identities of the second type of the virtual network functions.

6. The apparatus according to claim 4, wherein the physical connection related parameter depends on the physical location where the corresponding identities of the second type of the virtual network functions are established.

7. The apparatus according to claim 4, wherein the processor is configured to
perform configuration of the identities of the second type of the virtual network functions with the physical connection related parameter.

8. The apparatus according to claim 1, wherein the processor is configured to detect changes of the physical condition of the identities of the second type of the virtual network functions and to manage the information regarding the identities of the second type of the virtual network functions.

9. The apparatus according to claim 1, wherein the physical location includes a physical entity, physical environment or a physical machine.

10. A method comprising:
setting up and maintaining virtual network functions;
storing identities of a first type of the virtual network functions and of a second type of the virtual network functions, wherein the first type of the virtual network functions is configured to select one or more of the second type of the virtual network functions;
maintaining, for each identity of the first type of the virtual network functions, information regarding identities of the second type of the virtual network functions, which are selectable by the corresponding identity of the first type of the virtual network functions, based on information regarding physical conditions of the identity of the first type of the virtual network functions and the identities of the second type of the virtual network functions;

configuring the information regarding the identities of the second type of the virtual network functions with different priorities for different physical conditions; and providing the information regarding the identities of the second type of the virtual network functions configured with the different priorities for the different physical conditions to each identity of the first type of the virtual network functions via a network management interface defined between a network function virtualized orchestrator and the first type of the virtualized network functions.

11. The method according to claim 10, wherein a physical condition of the first or the second type of the virtual network functions includes
a physical location where the identities of the first or the second type of the network functions are established, or
a hardware connection condition at the physical location.

12. The method according to claim 10, wherein the physical condition of the first or the second type of the virtual network functions includes a physical location where the identities of the first or the second type of the virtual network functions are established, and the method further comprises
maintaining the information regarding the identities of second type of the virtual network functions by maintaining only those identities of the second type of the virtual network functions which are established on the same physical location.

13. The method according to claim 10, wherein
the information regarding the identities of the second type of the virtual network functions provided for each of the identity of the first type of the virtual network functions comprises a physical connection related parameter, which indicates condition or quality of a physical connection between the physical location of each identity of the first type of the virtual network functions and the physical location of the corresponding identities of the second type of the virtual network functions.

14. The method according to claim 13, wherein the physical connection related parameter indicates a classification of the physical connection or proximity between the physical location of each identity of the first type of the virtual network functions and the physical location of the corresponding identities of the second type of the virtual network functions.

15. The method according to claim 13, wherein the physical connection related parameter depends on the physical location where the corresponding identities of the second type of the virtual network functions are established.

16. The method according to claim 13, further comprising:
performing configuration of the identities of the second type of the virtual network functions with the physical connection related parameter.

17. The method according to claim 10, further comprising:
detecting changes of the physical condition of the identities of the second type of the virtual network functions and
managing the information regarding the identities of the second type of the virtual network functions.

18. The method according to claim 10, wherein the physical location includes a physical entity, physical environment or a physical machine.

19. A computer program product embodied on a non-transitory computer-readable medium, said product comprising code means for performing a method according to claim 10 when run on a processing means or module.

* * * * *